June 28, 1927.
L. A. MAPEL
1,633,672
INDICATING INSTRUMENT
Filed Oct. 7, 1920
2 Sheets-Sheet 1
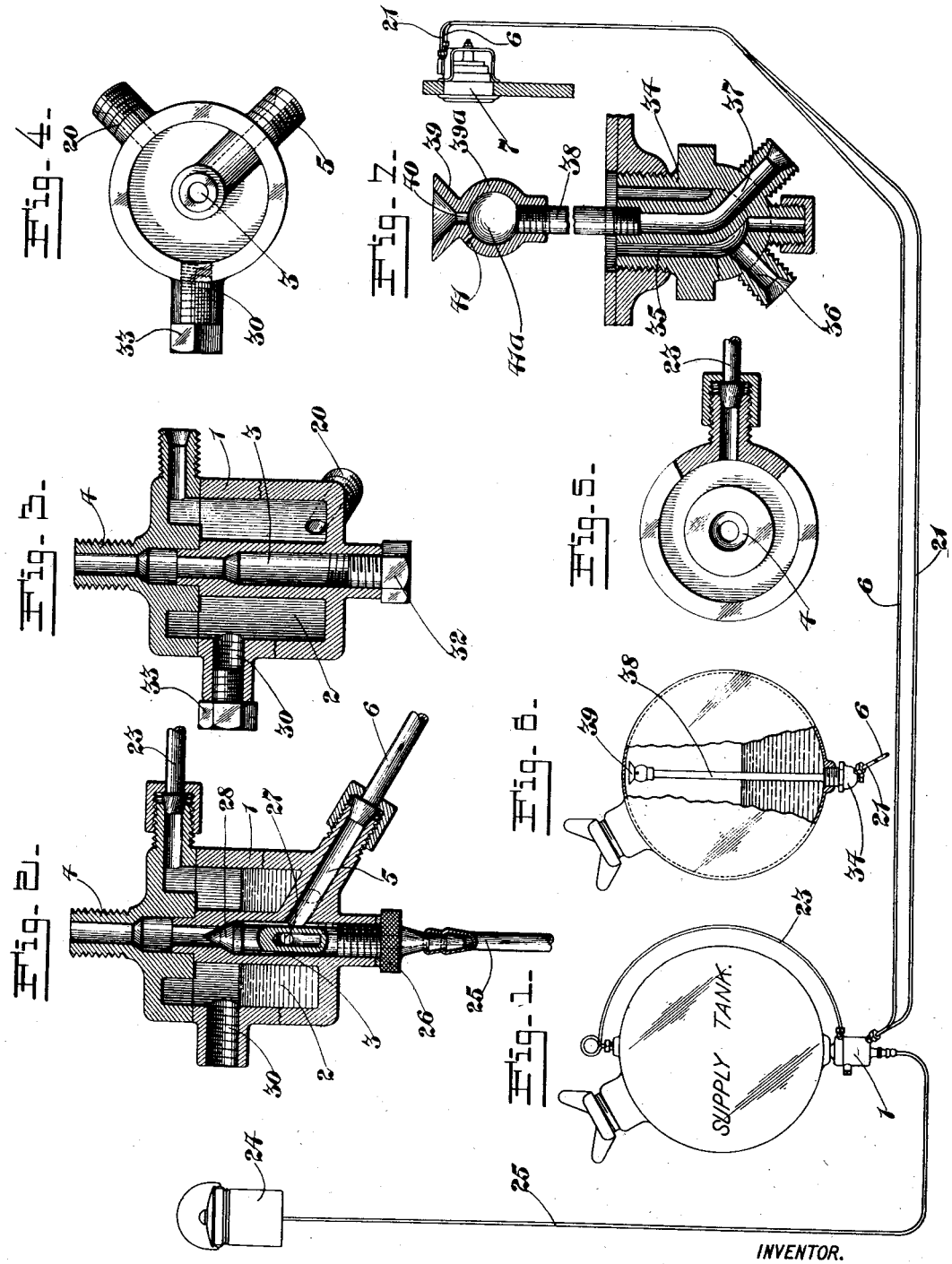
INVENTOR.
LEWIS A. MAPEL,
BY
Rippey Kingsland,
HIS ATTORNEYS.

June 28, 1927. 1,633,672
L. A. MAPEL
INDICATING INSTRUMENT
Filed Oct. 7, 1920 2 Sheets-Sheet 2
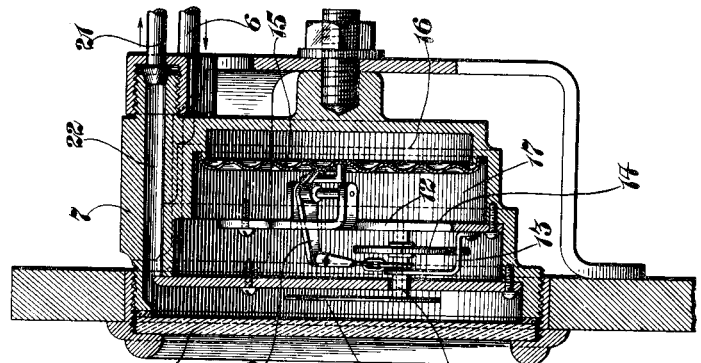
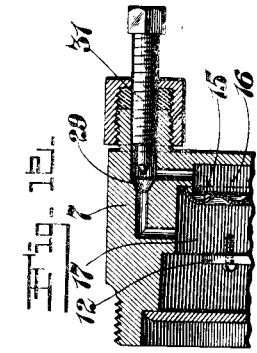
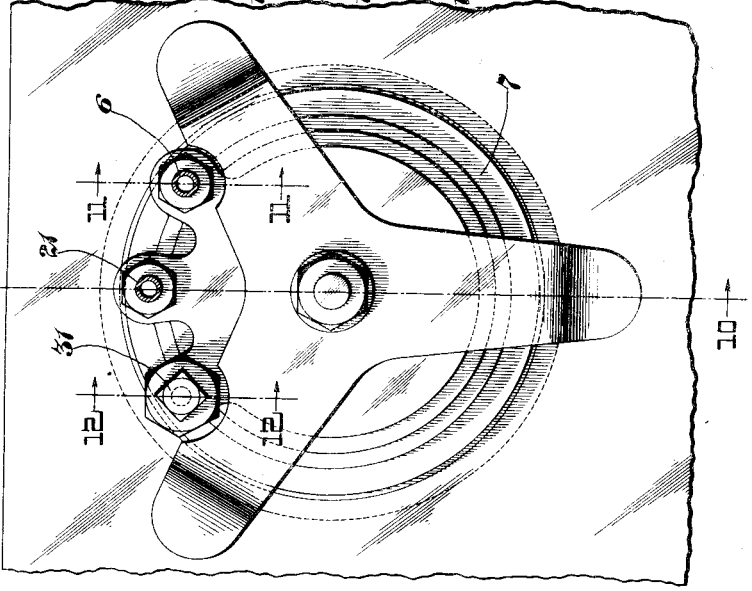
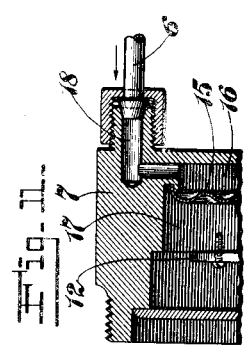
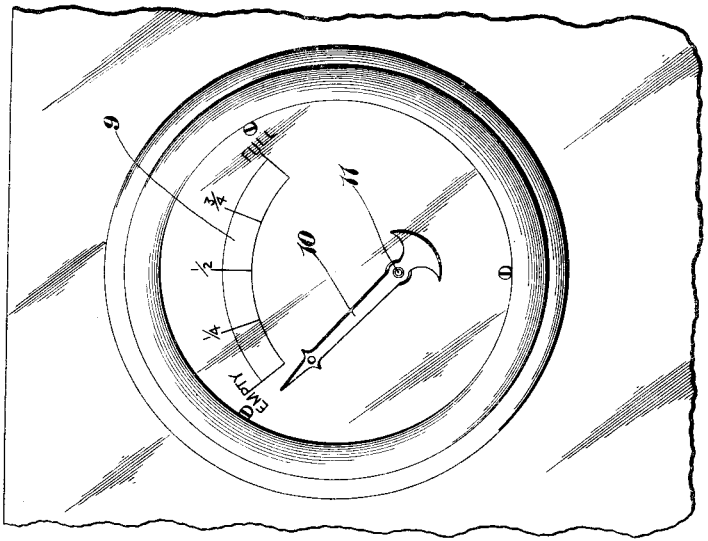
INVENTOR.
LEWIS A. MAPEL,
BY
*Rippey Kingsland,*
HIS ATTORNEYS.

Patented June 28, 1927.

1,633,672

UNITED STATES PATENT OFFICE.

LEWIS A. MAPEL, OF ST. LOUIS, MISSOURI, ASSIGNOR TO THE AUTOMATIC APPLIANCE COMPANY, OF ST. LOUIS, MISSOURI, A CORPORATION OF MISSOURI.

INDICATING INSTRUMENT.

Application filed October 7, 1920. Serial No. 415,316.

This invention relates to instruments for indicating the approximately exact height, depth or quantity of liquid or the contents of liquid containers.

My invention comprises an instrument which is especially adapted for use on automobiles, or other vehicles, or on vessels, to indicate constantly to the operator or observer the approximately exact height, depth or quantity of liquid in storage tanks or other bodies of liquids, irrespective of variations in the level or position of the vehicle or vessel, and irrespective of whether the vehicle or vessel is in motion or stationary. It is well known that vehicles such as automobiles and the like, and vessels such as boats, ships, or airplanes and the like, when travelling are subject to frequent variations in their position or level with reference to the normal horizontal axis thereof. In the case of automobiles and the like there are constant variations in the level or angles of inclination of the streets and roads over which the vehicles travel; and also in the case of boats and ships there is frequent variation in the positions thereof, due to the water waves or other conditions; and these variations of position also apply to airplanes particularly when the airplane is rising or landing, and also when the airplane rises and descends during flight.

My instrument is specially adapted for use in connection with all such vehicles of transportation whether on land, on or under the water, or in the air, and as will hereinafter appear, the instrument may be used with equal efficiency in connection with stationary mechanisms. I do not restrict myself to use of the invention in connection with either moving or stationary mechanisms, nor in other unessential particulars, as I contemplate using the invention wherever satisfactory use thereof may be made.

An object of the invention is to provide an instrument which may be readily embodied as a part of the equipment of any vehicle, machine or apparatus with which it may be advantageously used and which will afford constant visual indication of the approximately exact height, depth or quantity of liquid, whether in the form of gasoline, oil, water or semiliquid remaining available for use at the source of supply with which the instrument is in communication.

Another object of the invention is to provide an instrument of the character and for the purpose mentioned which will not be affected by the variations of the horizontal axis of the vehicle, vessel or machine from the normal horizontal position; but which will continue, irrespective of such variations, to afford approximately accurate and definite indication of the height, depth or quantity of liquid remaining unconsumed at the source of supply.

Another object of the invention is to provide an instrument of the character and for the purpose mentioned which will not be affected by the variations in temperature, or barometric changes, whether such variations are climatic variations or are artificial, except in the case of the most extreme cold at which the liquid might become frozen or congealed, or in the case of extreme heat under which the liquid might become vaporized.

As applied to ships or boats, the instrument may be very satisfactorily used not only to indicate the height, depth or quantity of liquid in storage tanks and in other sources of supply, but the instrument may be used as well to indicate satisfactorily variations in the longitudinal or transverse axis of the ship or boat in landing, so that the load or cargo may be properly distributed throughout the ship or boat. Such indication will be constantly given without the necessity of going from one place to another on the ship or boat to observe the position and manner in which the cargo is being placed. Such indication being constantly given while the ship or boat is being loaded the necessity of shifting the cargo after the ship or boat leaves port will be avoided. The instrument may be used with equally satisfactory results to indicate the mean and effective draft of the ship or boat, from which the weight of the cargo can be computed.

The instrument may be used with equally satisfactory results to indicate the approximate depth to which a submarine or other subaqueous vessel is submerged.

In addition to the above advantages and uses of the invention, it will be apparent that the invention may also be used with a high degree of efficiency and satisfaction to indicate approximately the height, depth or quantity of water remaining in dams or reservoirs, as well as the head of water in the case of dams used for the generation of hydro-electric power, or for other purposes.

Furthermore, the invention may be used to indicate the stage of water in rivers or elsewhere in which the stage of water is subject to variations, such as tides.

My improved instrument is constructed and designed so that it will function properly to give the desired indication whether mounted near the source of liquid supply or at a point remote from the source of supply.

Various other objects, advantages and uses of the invention are contemplated and will be apparent from the following description in which I make reference to the drawings showing one satisfactory embodiment of the invention, and in which Fig. 1 is a view illustrating the general arrangement of the device when applied to an automobile to indicate the approximately exact height, depth or quantity of gasoline in the supply tank, the indicating device being located on the instrument board.

Fig. 2 is a vertical sectional view of a tank fitting which constitutes a part of my invention, showing a passage in connection therewith for filling the instrument to complete the installation thereof.

Fig. 3 is a similar sectional view of the tank fitting detached from the filling passage.

Fig. 4 is a plan view of the fitting.

Fig. 5 is a view looking toward the lower end of the top portion of the fitting detached from the lower portion of the fitting.

Fig. 6 is a view illustrating a second form of fitting applied to the liquid supply tank.

Fig. 7 is an enlarged sectional view of the second form of fitting.

Fig. 8 is a view showing the face of the indicating device on the instrument board of an automobile or other support.

Fig. 9 is a view showing the opposite end of the device, the passages leading thereto being shown in section.

Fig. 10 is a vertical sectional view on the line 10—10 of Fig. 9.

Fig. 11 is a vertical sectional view of a portion of the device on the line 11—11 of Fig. 9. showing specially the inlet passage to the rear compartment of the indicating device.

Fig. 12 is a sectional view on the line 12—12 of Fig. 9 showing specially the passage for permitting flow of the liquid from the rear compartment to the front compartment, and the valve controlling said passage.

In every case it will be understood that the indicating device is preferably mounted or supported in a position convenient for inspection whether the invention be applied in connection with a stationary reservoir or tank, or in connection with a moving current, or upon a moving vehicle or vessel.

As shown the indicating device is supported in a position convenient for observation so as to afford constant indication of the approximately exact height, depth or quantity of liquid, and variations in the height, depth or quantity of the liquid. For convenience of illustration I have shown the device in detail as applied to the supply tank and instrument board of an automobile.

The invention comprises a fitting in the form of a casing having a chamber therein and also having a passage therethrough, an indicating device divided into compartments and having passages leading from said compartments respectively to the chamber and the passage respectively in the fitting, and an indicating mechanism for indicating the height, depth or quantity of liquid in the tank to which the fitting is applied. In the embodiment shown in Fig. 2 the fitting comprises a casing 1 formed with a chamber 2 therein and with a passage 3 extending entirely across the vertical length of the chamber for communication with the tank. A projection 4 on the upper end of the fitting constitutes means for connection with the tank and has a passage for admitting liquid from the tank into the passage 3.

An outlet opening 5 from the passage 3 is in communication with a pipe or passage 6 leading to the rear compartment of the indicating instrument, so that after the instrument has been applied and filled with liquid the indicating device will be affected by variation in the height, depth or quantity of liquid contained in the tank to afford constant indication of the height, depth or quantity of liquid remaining in the tank.

The indicating instrument is more completely shown in Figs. 8 to 12 inclusive and comprises a casing 7 having a transparent front wall 8 through which the dial 9 and pointer 10 may be observed. The pointer 10 is attached to a spindle 11 supported for free rotation by a bracket 12 within the casing 7 and an arm 13 attached to the bracket. A spring 14 is connected to the spindle 11 to eliminate lost motion in the indicating mechanism. A diaphragm 15 within the casing 7 divides the casing into a rear compartment 16 and a front compartment 17, a passage 29 (Fig. 12) connecting the compartments 16 and 17. Said compartments 16 and 17 are put in or out of communication with each other by means of a valve 31, and it is into the rear compartment 16 that the pipe 6 (Fig. 11) opens through an appropriate passage 18, in order to admit liquid into said compartment 16 from the supply tank. An appropriate lever and link connection 19

(Fig. 10) are provided between the spindle 11 and the diaphragm 15 whereby the spindle and thereby the pointer 10 will be caused to respond and to assume positions relative to the dial 9 (Fig. 8) corresponding to or commensurate with the height, depth or quantity of liquid contained or remaining in the supply tank. This result, however, is accomplished only because both of the compartments 16 and 17 are kept filled with liquid, but from different sources of supply.

The chamber 2 (Fig. 2), which is out of communication with the passages 3 and 5, constitutes a liquid receptacle and has an outlet passage 20 (Fig. 3) in connection with a pipe 21 (Fig. 1) communicating with a passage 22 in the casing (Fig. 10) opening into the compartment 17. A passage 23 (Fig. 1) from the liquid supply tank, above the level of the liquid therein, opens into the chamber 2 (Fig. 2) above the level of the liquid in said chamber. The relative area of the chamber 2 to the combined areas of the passage 21 and compartment 17 is such that the height of the liquid in the chamber 2 is not materially changed by maximum expansion or contraction of the liquid in the passage 21 and compartment 17.

Figs. 6 and 7 show another form of fitting including a form of communication from the fitting to the supply tank, above the level of the liquid in the supply tank. The fitting shown in Figs. 6 and 7 comprises a casing 34 having a chamber 35 therein opening into the supply tank so as to receive the pressure of the liquid in the supply tank upon the column of liquid leading to the indicating instrument in approximately the same way that the pressure of the liquid in the supply tank is received upon the column of liquid leading to the instrument through the passage 3 in the form previously described. As shown in Fig. 7, the fitting is provided with means 36 for connection with a pipe 6, leading to the instrument. Also, the fitting shown in Fig. 7 is provided with a passage 37 for connection with a pipe 21, communicating with the indicating instrument. Extending from the casing 34 into the supply tank is a pipe 38 communicating with and opening into the passage 37 and equipped on its upper end with a device 39ª having a hopper or funnel 39 above the level of the liquid in the tank, said hopper having an opening 40 through the bottom thereof. The hopper 39 receives splashes of liquid, caused as an incident to travel of the vehicle or vessel, and discharges small quantities of liquid through the opening 40 into the chamber 41ª to maintain a constant level of the liquid therein. A vent 41 is provided below the passage 40 for the discharge of air which might otherwise prevent flow of the liquid from the hopper into the chamber 41ª. The relative area of the chamber 41ª to the combined areas of the pipe 38, passage 21 and the compartment 17, is such that the height of the liquid in the chamber 41ª is not materially changed by maximum expansion or contraction of the liquid in the pipe 38, pipe 21 and compartment 17.

From the foregoing it will be apparent that the hole 40 also functions to equalize the pressure above the liquid in the chamber 41ª with the pressure above the liquid in the tank as does the pipe 23 function to equalize the pressure above the liquid in the chamber 2 with the pressure above the liquid in the tank (Figs. 1 and 2) irrespective of any variation of such pressure. The liquid in the chamber being in communication with the normally actuated air above the level of the liquid in the tank, evaporation of the liquid in the chamber is prevented. It is essential that the level of the liquid be maintained approximately uniform at all times in the chamber in order to obtain the best results.

When the installation of the instruments is complete the compartments 16 and 17 (Fig. 10) are out of communication with each other, except in an indirect way through the supply tank and thence through the pipe 23, the receptacle 2 and the pipe 21.

By reference to the drawings, special reference being made to Figs. 1 and 6, it will be seen that the pipes 6 and 21 are of small diameter. In practice the pipes 6 and 21 are preferably hollow wire which is sufficiently flexible to permit proper installation of the pipes, the same being bent or curved wherever required without the necessity of using special fittings or pipe connections which would be the case if large or inflexible pipes were used. The hollow wire or pipes of small diameter possess the distinct advantage of holding or retaining the liquid in them by cohesion or capillary attraction of the liquid with the pipes, so that the liquid will not become displaced or flow out of the pipes by its own weight or by gravity. The capillary attraction of the liquid for the metal of the pipes maintains a perfect seal so that it is impossible for air to pass or to displace the liquid in the pipes, unless the air be under pressure or suction other than that to which it is subjected under normal conditions of operation.

The method in which the instrument functions and operates is more clearly comprehended by including a consideration of the manner and equipment by which the instrument is installed and placed in condition for use. The drawings show such equipment which I will now proceed to describe.

After the instrument has been mounted and connected up in the manner above described, liquid is supplied to the instrument through the passages 3, 5, 6 and 18 until the casing 7 is completely filled with the liquid so as to exclude all air therefrom, as well as from the passages connecting the casing 7 with the fitting 1. The exclusion of the air places the instrument entirely under the control of the liquid so that the position of the pointer 10 will be determined entirely by the height, depth or quantity of liquid contained in the supply tank, free from other influences. Liquid may be supplied to fill the instrument in any desired way, as from a supply vessel 24 (Fig. 1) through the passage 25 communicating with an opening through a member 26 (Fig. 2) releasably secured within the passage 3 and having discharge outlets 27 through which the liquid is discharged into the passage 3 and thence to the indicating instrument through the passage connecting the fitting 1 with said instrument. The member 26 includes a valve portion 28 which, by contact with an appropriate valve seat in the passage 3, closes communication with the tank while the instrument is being filled.

Reference is now made to Fig. 12 in which it will be seen that the casing 7 includes a passage 29 by which communication may be effected between the compartments 16 and 17. The compartment 16 becomes first filled with liquid, and, as the flow of liquid continues, the liquid flows through the passage 29 into the comparement 17 and continues until the compartment 17 becomes filled. As the compartment 16 is filled the air is forced therefrom through the passage 29 into the compartment 17; and as the compartment 17 becomes filled the air is forced from the compartment 17 through the passage 22 leading from said compartment 17, thence through the passage 21 leading to the fitting 1. The flow of the liquid is continued until the the compartments 16 and 17 are completely filled and until the liquid overflows from the compartment 17 through the passages 21 and 22, leading from said compartment 17 to the fitting 1. The liquid which flows to the fitting 1 from the compartment 17 enters the chamber 2 in the fitting and rises in said chamber 2 until the liquid overflows through an overflow opening 30 (Figs. 2 and 3). The overflow of the liquid through the opening 30 affords an indication that the instrument is filled, and that no more liquid is needed to place the instrument in condition for use.

Next, the valve 31 (Fig. 12) is closed in order to close, permanently, communication between the compartments 16 and 17. Then the equipment for filling the instrument is detached by removing the part 26 and closing the lower end of the passage 3 by a closure 32 (Fig. 3). Also, the overflow opening 30 is closed by a closure 33.

From the foregoing it can be readily seen that the installation of the device, using the fitting as shown in Figs. 6 and 7, is accomplished as follows:

Liquid is forced through the fitting 39 and the pipe 38 thence through the passage 37 and pipe 21 into the compartment 17, whence it passes through the passage 29 to the compartment 16, filling the same out through the passage 18 (Fig. 11), thence through the pipe 6 to the passage 36 (Fig. 7) and up into the chamber 35. Upon the liquid overflowing from the chamber 35 the valve 31 aforementioned is closed.

After the instrument has been filled, as above described or otherwise, and the means for filling the instrument has been detached and the other described adjustments have been made, the supply tank may be filled. The liquid in the tank communicates with the pipe 6 through the passage 3 (Fig. 2) or the chamber 35 (Fig. 7), whereby the weight of the liquid in the tank is imparted to the liquid column in the pipe 6 communicating with the compartment 16, and thereby to the liquid in the compartment 16 and against one side of the diaphragm 15. The other side of the diaphragm is acted upon by the liquid in the compartment 17 by means of the weight of the column of liquid in the pipe 21, which column of liquid terminates in the level of the liquid in either the chamber 2 or the pipe 38, which level is maintained as previously described. Said pipe 21 is located adjacent to the pipe 6 so that the column of liquid in each pipe is affected alike by any change in conditions of temperature, barometric, acceleration, etc., causing the diaphragm to be wholly responsive to the weight of the liquid in the tank. Thus, the diaphragm 15 is caused to control the pointer 10 which assumes a position relative to the dial 9 indicating the approximately exact height, depth or quantity of the liquid within the supply tank. As the height, depth or quantity of liquid within the supply tank varies, the pressure against the diaphragm 15 also varies, thereby causing the pointer 10 to respond to such variation and to indicate constantly the approximately exact height, depth or quantity of the liquid contained in the supply tank. The instrument functions to afford approximately accurate indications of the height, depth or quantity of the liquid contained in the supply tank, whether the liquid is under pressure, or otherwise.

It is obvious from the foregoing that the instrument is to conform with the character of the liquid to be measured, also that the scale on the dial between "Empty" and "Full" (Fig. 8) over which the indicator travels, can be graduated to read "Altitude feet" or "Contents gallons," or fractional parts thereof, same being computed from the capacity and dimensions of the tank. The dial is so arranged that when the pointer registers at "Empty" a limited supply of liquid still remains in the tank, thus indicating to the operator that the supply of liquid should be replenished, and this indication is afforded as an emergency feature so that the supply may be replenished before it is completely exhausted.

The instrument may be used with satisfaction to indicate the pressure of any liquids or semi-fluid substances, and it is not necessary that the instrument be filled with the same character of liquid that is contained in the supply tank. It is necessary that the instrument be filled with some transparent liquid through which the dial and the pointer may be observed as they are both immersed in or covered by the liquid.

It will be seen that in accordance with this invention means is provided for establishing a datum level for the indicating device and that this datum level is maintained uniform. The pipe or reservoir 38 maintains a column of liquid, which in the specific embodiment shown and described, maintains on the diaphragm or element a constant pressure, while the connection from the tank to the indicating device applies to the element a pressure varying in accordance with the head of the liquid in the tank. Accordingly the pipe 38 and its connections to the instrument establishes a datum level, that is, a level from which the readings of the instrument are taken. This datum level is, however, not only established but is also maintained uniform by the provision of a collector arranged within the tank and spaced from the top thereof and so formed as to catch as well as retain the splashing liquid. Accordingly the diaphragm or element of the indicating device is always responsive to the varying head of the liquid in the tank.

The collector is in the form of an enlargement provided with a cup which has a flared opening but has a restricted port 40 adapted to admit the splashing liquid to the pipe in order to restrict evaporation of the liquid from the pipe. This collector also has an overflow 41 in order to fix the datum level. This collector is, however, above the normal level of the liquid in the tank so as to maintain on the diaphragm or element a constant head greater than the normal varying head of the liquid; accordingly the maintenance of the established datum level is obtained in a convenient and effective manner without the use of float chambers or other mechanically moving parts.

In accordance with this invention an apparatus is provided for indicating the head of a liquid in a vehicle tank wherein the liquid splashes while the vehicle is in motion, and the splash of the liquid is relied upon to maintain the datum level uniform. Accordingly, cooperating with an indicating device arranged for connection with the tank and having an element, such as a diaphragm which is responsive to the varying head of the liquid in the tank, is a device for establishing a datum level for the indicating device. This device includes a collector 39ª arranged within the tank and spaced from the top thereof, and so formed as to catch the splashing liquid. This collector is in the form of an enlargement or cup on the end of a stand pipe 38 and this cup has a flared part 39 which connects with the cup through a restricted port 40 so that the flared part not only catches the splashing liquid but is adapted to direct the liquid to the collector cup while the port is adapted to admit the liquid to the collector. This cup is also provided with an over-flow 41 which is adapted to discharge excess liquid from the collector. Accordingly not only is a datum level established for the indicating device but this datum level is also maintained uniform.

Having described my invention, it is apparent that it completely serves its objects. It is adapted for many uses, only a few of which I have attempted to mention, and it may be varied in numerous respects without departing from the nature and principle of the invention. In describing the preferred embodiment of the invention I do not restrict myself to any specific or unessential particulars, nor do I exclude variations in the form of construction or arrangement of the invention that are within the scope of the appended claims.

What I claim and desire to secure by Letters Patent, is:—

1. An apparatus for indicating the head of a liquid in a vehicle tank wherein the liquid splashes while the vehicle is in motion, comprising, an indicating device connected with the tank and having an element which is responsive to the varying head of the liquid in the tank, and means for establishing a datum level for said indicating device, including a collector arranged within the tank and spaced from the top thereof and so formed as to catch the splashing liquid in order to maintain such datum level uniform.

2. An apparatus for indicating the head of a liquid in a vehicle tank wherein the liquid splashes while the vehicle is in motion, comprising an indicating device connected with the tank and having an element which is responsive to the varying head of the liquid in the tank, and means for establishing a datum level for said indicating device, including a pipe having at its upper end and above the liquid in the tank, a cup whose opening is so formed and spaced from the top of the tank as to catch the splashing liquid in order to maintain such datum level uniform.

3. An apparatus for indicating the head of a liquid in a vehicle tank wherein the liquid splashes while the vehicle is in motion, comprising, an indicating device connected with the tank and having an element which is responsive to the varying head of the liquid in the tank, and means for establishing a datum level for said indicating device, including a collector positioned within the tank so as to catch the splashing liquid and provided with a restricted port adapted to admit the liquid to the collector.

4. An apparatus for indicating the head of a liquid in a vehicle tank wherein the liquid splashes while the vehicle is in motion, comprising, an indicating device connected with the tank and having an element which is responsive to the varying head of the liquid in the tank, and means for establishing a datum level for said indicating device, including a collector positioned within the tank so as to catch the splashing liquid and provided with an overflow adapted to discharge excess liquid from the collector.

5. An apparatus for indicating the head of a liquid in a vehicle tank wherein the liquid splashes while the vehicle is in motion, comprising, an indicating device connected with the tank and having an element which is responsive to the varying head of the liquid in the tank, and means for establishing a datum level for said indicating device, including a collector positioned within the tank so as to catch the splashing liquid and provided with a restricted port adapted to direct the liquid to the collector and an overflow adapted to discharge excess liquid from the collector.

6. An apparatus for indicating the head of a liquid in a vehicle tank wherein the liquid splashes while the vehicle is in motion, comprising, an indicating device connected with the tank and having an element which is responsive to the varying head of the liquid in the tank, and means for establishing a datum level for said indicating device, including a pipe rising within the tank, terminating in a flaring opening adapted to catch the splashing liquid and provided with a restricted port leading from said opening and to said pipe.

7. An apparatus for indicating the head of a liquid in a vehicle tank wherein the liquid splashes while the vehicle is in motion, comprising, an indicating device connected with the tank and having an element which is responsive to the varying head of the liquid in the tank, and means for establishing a datum level for said indicating device, including a pipe rising within the tank and provided at its upper end with an enlargement terminating in a cup which has a restricted connection with said enlargement.

8. In an automobile having an instrument board, a fuel tank which is open to the atmosphere, an indicating device adapted for mounting on the instrument board and having a responsive element, a hydrostatic connection from the bottom of said tank to one side of said element adapted to cause said element to respond to the varying head of the liquid, a reservoir hydrostatically connected with the other side of said element and adapted to maintain a constant head thereon greater than the normal varying head of the liquid, and a restricted connection between the spaces above the liquid in said reservoir and in said tank adapted to maintain the same atmospheric conditions therein.

9. In an automobile having an instrument board, a fuel tank which is open to the atmosphere, an indicating device adapted for mounting on the instrument board and having a responsive element, a hydrostatic connection from the bottom of said tank to one side of said element adapted to cause said element to respond to the varying head of the liquid, a reservoir hydrostatically connected with the other side of said element and adapted to maintain a constant head thereon, a collector in the tank and above the normal level of the liquid therein adapted to maintain the level of the liquid in said reservoir, and a restricted connection between the spaces above the liquid in said reservoir and in said tank adapted to maintain the same atmospheric conditions therein.

10. In an automobile having an instrument board, a fuel tank which is open to the atmosphere, an indicating device adapted for mounting on the instrument board and having a responsive element, a capillary hydrostatic connection from the bottom of said tank to one side of said element adapted to cause said element to respond to the varying head of the liquid, a reservoir having a capillary hydrostatic connection with the other side of said element and adapted to maintain a constant head thereon, and a restricted connection between the spaces above the liquid in said reservoir and in said tank adapted to maintain the same atmospheric conditions therein.

11. An apparatus for indicating the head of a liquid in a vehicle tank wherein the liquid splashes while the vehicle is in motion, comprising, an indicating device connected with the tank and having an element which is responsive to the varying head of the liquid in the tank, means for establishing a datum level for said indicating device, including a pipe rising within the tank and in which a column of liquid is adapted to stand, and means operating automatically adapted to maintain such a column at a uniform height in order to maintain such datum level.

12. An apparatus for indicating the head of a liquid in a vehicle tank wherein the liquid splashes while the vehicle is in motion, comprising, an indicating device, connected with the tank and having an element which is responsive to the varying head of the liquid in the tank, means for establishing a datum level for said indicating device, including a pipe rising within the tank and in which a column of liquid is adapted to stand, means for retaining the liquid against splashing from said pipe, and means operating automatically for supplying liquid to said pipe adapted to maintain such column at a uniform height in order to maintain such datum level.

13. An apparatus for indicating the head of a liquid in a vehicle tank wherein the liquid splashes while the vehicle is in motion, comprising, an indicating device connected with the tank and having an element which is responsive to the varying head of the liquid in the tank, means for establishing a datum level for said indicating device, including a pipe rising within the tank and having an overflow so as to provide a liquid column of a predetermined height, and means operating automatically for supplying liquid to said pipe adapted to maintain such column at a uniform height in order to maintain the datum level.

LEWIS A. MAPEL.